(12) United States Patent
Yang et al.

(10) Patent No.: US 12,507,185 B2
(45) Date of Patent: Dec. 23, 2025

(54) SYNCHRONIZATION SIGNAL TRANSMISSION METHOD AND DEVICE

(71) Applicant: VIVO MOBILE COMMUNICATION CO., LTD., Dongguan (CN)

(72) Inventors: Kun Yang, Dongguan (CN); Kai Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 352 days.

(21) Appl. No.: 17/880,579

(22) Filed: Aug. 3, 2022

(65) Prior Publication Data

US 2022/0394638 A1     Dec. 8, 2022

Related U.S. Application Data

(63) Continuation of application No. PCT/CN2021/075091, filed on Feb. 3, 2021.

(30) Foreign Application Priority Data

Feb. 6, 2020    (CN) .......................... 202010081750.1

(51) Int. Cl.
    *H04W 56/00*    (2009.01)
    *H04L 5/00*     (2006.01)
(52) U.S. Cl.
    CPC ........... *H04W 56/001* (2013.01); *H04L 5/001* (2013.01)
(58) Field of Classification Search
    CPC ... H04W 56/001; H04W 48/12; H04W 48/16; H04L 5/001; H04L 5/005; H04L 5/0094

USPC ......................................................... 370/350
See application file for complete search history.

(56) References Cited

U.S. PATENT DOCUMENTS

| | | | |
|---|---|---|---|
| 2019/0110300 A1 | 4/2019 | Chen et al. | |
| 2019/0182817 A1* | 6/2019 | Agiwal | H04W 72/20 |
| 2019/0327123 A1* | 10/2019 | Wang | H04L 27/26 |
| 2020/0154446 A1* | 5/2020 | Yerramalli | H04W 72/23 |
| 2021/0068191 A1* | 3/2021 | Liu | H04W 56/001 |
| 2021/0282079 A1* | 9/2021 | Wu | H04L 5/005 |
| 2021/0360558 A1* | 11/2021 | Zheng | H04W 56/0015 |

(Continued)

FOREIGN PATENT DOCUMENTS

| | | |
|---|---|---|
| CN | 109699067 A | 4/2019 |
| CN | 110431789 A | 11/2019 |

(Continued)

OTHER PUBLICATIONS

Extended European Search Report issued in related European Application No. 21750585.8, mailed Jun. 14, 2023, 10 pages.

(Continued)

*Primary Examiner* — Rownak Islam
(74) *Attorney, Agent, or Firm* — IPX PLLC

(57) ABSTRACT

A synchronization signal transmission method and a device are provided. The method includes: receiving first configuration information, where the first configuration information is used to indicate a first synchronization signal block SSB, and a frequency domain position of the first SSB is different from that of a second SSB, where the second SSB is obtained by cell search; or the second SSB is indicated by second configuration information; and the first configuration information and the second configuration information are carried in same or different signaling.

18 Claims, 3 Drawing Sheets

(56) References Cited

U.S. PATENT DOCUMENTS

2021/0378018 A1* 12/2021 Jang .................. H04W 74/0833
2022/0174624 A1* 6/2022 Wu ..................... H04L 5/0094
2023/0083692 A1* 3/2023 Liu .................... H04W 56/001

FOREIGN PATENT DOCUMENTS

| | | | |
|---|---|---|---|
| CN | 110475309 A | 11/2019 | |
| CN | 110519843 A | 11/2019 | |
| CN | 110536456 A | 12/2019 | |
| WO | 2019029597 A1 | 2/2019 | |
| WO | 2019047945 A1 | 3/2019 | |
| WO | 2019066618 A1 | 4/2019 | |
| WO | 2019136646 A1 | 7/2019 | |
| WO | 2019190236 A1 | 10/2019 | |
| WO | 2019221553 A1 | 11/2019 | |
| WO | 2019242027 A1 | 12/2019 | |
| WO | 2020006752 A1 | 1/2020 | |

OTHER PUBLICATIONS

AT&T et al., "RMSI Transmission on SCell", 3GPP Draft, R1-1911241, Oct. 2019, 6 pages.

Search Report issued in related Chinese Application No. 202010081750. 1, mailed Jun. 25, 2023, 3 pages.

AT&T, "Details of SS Block and CSI-RS Measurement Configurations", 3GPP TSG-RAN WG2 #99bis, R2-1711674, Oct. 2017, 5 pages.

International Search Report issued in corresponding International Application No. PCT/CN2021/075091, mailed Apr. 16, 2021, 4 pages.

First Office Action issued in related Chinese Application No. 202010081750.1, mailed Dec. 29, 2021, 27 pages.

OPPO, "Discussion on UE redistribution within wideband carrier" 3GPP TSG-RAN2#101bis, R2-1804561, Apr. 20, 2018.

Ericsson "SSB raster design of Rel-16 NR-U" 3GPP TSG-RAN4 Meeting #90bis, R4-1904255, Apr. 13, 2019.

ZTE et al., "CR for introducing per BWP SSB configuration" 3GPP TSG-RAN\WG2_RL2, R2-1804374, Apr. 2018.

Ericsson, "Preamble modelling and configuration with multiple SSBs" 3GPP TSG-RAN WG2 #99bis, R2-1711176, Oct. 2017.

Qualcomm, "On the necessity of adding SSB frequency location in SSB configuration as RLM-RS" 3GPP TSG-RAN WG2 Meeting #101bis, R2-1805205, Apr. 2018.

Qualcomm, "CR to 38.331 for frequency location of SSB in RLM, BM and BFD (RIL Q144)" 3GPP TSG RAN WG2 Meeting #103, R2-1811081, Aug. 2018.

* cited by examiner

100            S102

Receive first configuration information, where the first configuration information is used to indicate a first synchronization signal block SSB, and a frequency domain position of the first SSB is different from that of a second SSB, where the second SSB is obtained by cell search; or the second SSB is indicated by second configuration information

FIG. 1

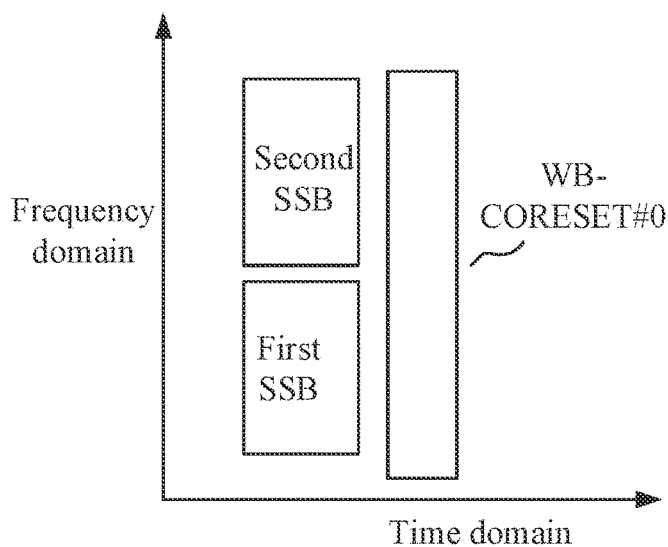

Transmit first configuration information, where the first configuration information is used to indicate a first synchronization signal block SSB, and a frequency domain position of the first SSB is different from that of a second SSB, where the second SSB is obtained by cell search; or the second SSB is indicated by second configuration information

FIG. 3

SYNCHRONIZATION SIGNAL TRANSMISSION METHOD AND DEVICE

CROSS-REFERENCE TO RELATED APPLICATIONS

This application is a continuation of International Application No. PCT/CN2021/075091, filed on Feb. 3, 2021, which claims priority to Chinese Patent Application No. 202010081750.1, filed on Feb. 6, 2020. The entire contents of each of the above-identified applications are expressly incorporated herein by reference.

TECHNICAL FIELD

Embodiments of the present disclosure relate to the field of communications, and in particular, to a synchronization signal transmission method and a device.

BACKGROUND

The synchronization signal design in the New Radio (NR) system is based on a conception of organizing Synchronization Signal/Physical Broadcast CHannel Blocks (SS/PBCH Block (SSB)) in sets, while SSB sets would limit a quantity of SSBs and a rule of time domain distribution of SSBs in a BandWidth Part (BWP). A maximum quantity of SSBs would limit a quantity of SSB beams, a beam width, and a beam gain, thus further limiting coverage of the SSBs and effects of measuring operations based on the SSBs.

Increasing the SSB beams can improve directionality of energy and obtain a higher beam gain, so as to enhance the coverage of the SSBs and so on. However, due to a limitation on a maximum quantity of SSB beams because of the frequency bands of FR1 and a possibility in actual deployment that time-division duplexing would occupy some SSB resources, there are fewer available SSBs in actual cases. Therefore, it is necessary to conceive a proper solution for extending an SSB set to increase available SSBs in the SSB set.

SUMMARY

Embodiments of the present disclosure are disclosed to provide a synchronization signal transmission method and a device.

According to a first aspect, a synchronization signal transmission method is provided. The method is performed by a terminal device and includes:
  receiving first configuration information, where the first configuration information is used to indicate a first synchronization signal block SSB, and a frequency domain position of the first SSB is different from that of a second SSB, where
  the second SSB is obtained by cell search; or
  the second SSB is indicated by second configuration information; and the first configuration information and the second configuration information may be carried in same or different signaling.

According to a second aspect, a synchronization signal transmission method is provided. The method is performed by a network device and includes:
  transmitting first configuration information, where the first configuration information is used to indicate a first SSB, and a frequency domain position of the first SSB is different from that of a second SSB, where
  the second SSB is obtained by cell search of a terminal device; or
  the second SSB is indicated by second configuration information; and
  the first configuration information and the second configuration information are carried in same or different signaling.

According to a third aspect, a terminal device is provided. The terminal device includes:
  a receiving module, configured to receive first configuration information, where the first configuration information is used to indicate a first SSB, and a frequency domain position of the first SSB is different from that of a second SSB, where
  the second SSB is obtained by cell search; or
  the second SSB is indicated by second configuration information; and
  the first configuration information and the second configuration information are carried in same or different signaling.

According to a fourth aspect, a network device is provided. The network device includes:
  a transmitting module, configured to transmit first configuration information, where the first configuration information is used to indicate a first SSB, and a frequency domain position of the first SSB is different from that of a second SSB, where
  the second SSB is obtained by cell search; or
  the second SSB is indicated by second configuration information; and
  the first configuration information and the second configuration information are carried in same or different signaling.

According to a fifth aspect, a terminal device is provided, including a processor, a memory, and a computer program that is stored in the memory and that can run on the processor. When the computer program is executed by the processor, steps of the synchronization signal transmission method according to the first aspect are implemented.

According to a sixth aspect, a network device is provided, including a processor, a memory, and a computer program that is stored in the memory and that can run on the processor. When the computer program is executed by the processor, steps of the synchronization signal transmission method according to the second aspect are implemented.

According to a seventh aspect, a computer-readable storage medium is provided. The computer-readable storage medium stores a computer program, and when the computer program is executed by a processor, the synchronization signal transmission method according to any one of the first aspect and the second aspect is implemented.

According to the manner of SSB transmission based on frequency domain multiplexing in the embodiments of the present disclosure, SSBs can be increased flexibly as required, and there will be more SSB beams because SSBs are increased, so that coverage of the SSBs and effects of measuring operations (for example, selection of beams in initial access) based on the SSBs are enhanced.

BRIEF DESCRIPTION OF DRAWINGS

The accompanying drawings illustrated herein are provided for further understanding of this application and are a part of this application. The exemplary embodiments of this application and descriptions thereof are used to explain this application and do not constitute an improper limitation on this application. In the accompanying drawings:

FIG. 1 is a schematic flowchart of a synchronization signal transmission method according to an embodiment of the present disclosure;

FIG. 2 is a schematic diagram of SSB distribution according to an embodiment of the present disclosure:

FIG. 3 is a schematic flowchart of a synchronization signal transmission method according to another embodiment of the present disclosure;

DETAILED DESCRIPTION

Figure 4:
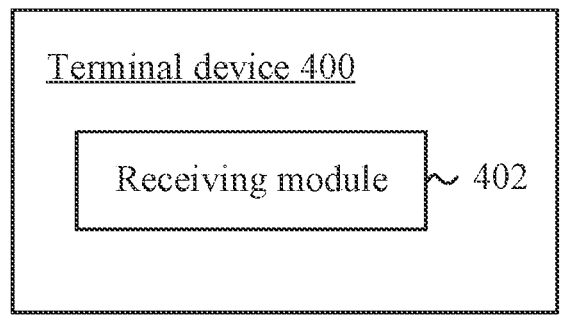
FIG. 4 is a schematic structural diagram of a terminal device according to an embodiment of the present disclosure.

The following describes the technical solutions of this application in conjunction with the embodiments of this application and the corresponding accompanying drawings. The described embodiments are merely some rather than all of the embodiments of this application. All other embodiments obtained by a person of ordinary skill in the art based on the embodiments of this application without creative efforts shall fall within the protection scope of this application. The term "and/or" in the embodiments of this specification indicates at least one of the former item and the latter item.

It should be understood that the technical solutions in the embodiments of the present disclosure may be applied to various communications systems, such as a Long Term Evolution (LTE) system, an LTE Frequency Division Duplex (FDD) system, an LTE Time Division Duplex (TDD) system, a Universal Mobile Telecommunication System (UMTS), or a Worldwide Interoperability for Microwave Access (WiMAX) communications system, a 5G system or a New Radio (NR) system, or a subsequent evolution communications system.

In the embodiments of the present disclosure, a terminal device may include, but is not limited to, a Mobile Station (MS), a mobile terminal, a mobile telephone, User Equipment (UE), a handset, portable equipment, a vehicle, and the like. The terminal device may communicate with one or more core networks through a Radio Access Network (RAN). For example, the terminal device may be a mobile telephone (or referred to as a "cellular" telephone), a computer having a wireless communication function, or the like; or the terminal device may be a portable, pocket-sized, handheld, computer built-in, or vehicle-mounted mobile apparatus.

In the embodiments of the present disclosure, a network device is an apparatus that is deployed in a radio access network and that is configured to provide a wireless communication function for the terminal device. The network device may be a base station, and the base station may include various types of macro base stations, micro base stations, relay stations, or access points. In systems using different radio access technologies, names of devices having a base station function may be different. For example, an evolved NodeB (eNB or eNodeB) in an LTE network is called a NodeB in a 3rd Generation (3G) network or a network device in a subsequent evolution communications system, but which word is used does not constitute a restriction.

As shown in FIG. 1, an embodiment of the present disclosure provides a synchronization signal transmission method 100. The method may be performed by a terminal device. In other words, the method may be performed by software or hardware installed on the terminal device. The method includes the following steps:

S102: receiving first configuration information, where the first configuration information is used to indicate a first Synchronization Signal Block (SSB), and a frequency domain position of the first SSB is different from that of a second SSB, where the second SSB is obtained by cell search; or the second SSB is indicated by second configuration information.

The first configuration information and the second configuration information may be carried in same or different signaling. In other words, the first configuration information and the second configuration information may be a same piece of configuration information; or the first configuration information and the second configuration information may be two pieces of different configuration information.

In an example, the first configuration information and/or the second configuration information indicate/indicates both time and frequency domain positions of the first SSB and the second SSB.

In another example, the terminal device obtains the time and frequency domain positions of the second SSB by cell search, and obtains the time and frequency domain positions of the first SSB by receiving the first configuration information.

The frequency domain positions of the first SSB and the second SSB are different from each other. In an example, within a window for synchronization of 5 ms, if both the first SSB and the second SSB exist, there are a plurality of candidate time domain resources of the first SSB, there are a plurality of candidate time domain resources of the second SSB, and quantities of the candidate time domain resources of the first SSB and the second SSB are the same. In this example, the plurality of frequency domain positions occupied by the first SSB are first frequency domain, the plurality of frequency domain positions occupied by the second SSB are second frequency domain, where the first frequency domain is different from the second frequency domain. There are a plurality of different candidate time domain positions of the first SSB, and for each candidate time domain position of the first SSB, there is one candidate time domain position of the second SSB that is the same as the time domain position of the first SSB.

In some embodiments, the first SSB and the second SSB are located in a same downlink BWP, and the first SSB and the second SSB are in a same SSB set. The SSB set may be a set of SSBs in a periodicity of transmitting SSBs in the downlink BWP; or the SSB set is a set of SSBs configured based on the first configuration information and/or the second configuration information.

In some embodiments, the first SSB and the second SSB are located in an initial downlink BWP. The initial downlink BWP is indicated in one of the following manners:

1) indicated by a Physical Broadcast CHannel (PBCH) included in the second SSB;
2) indicated by a System Information Block 1 (SIB 1); and
3) indicated by Radio Resource Control (RRC) signaling.

According to the synchronization signal transmission method provided in the embodiments of the present disclosure, the terminal device receives the first configuration information, and determines the time and frequency domain resources of the first SSB and the second SSB based on the first configuration information and/or the second configuration information; or determines the time and frequency domain resources of the second SSB by cell search, and determines the time and frequency domain resources of the first SSB based on the first configuration information, where the frequency domain positions of the first SSB and the second SSB are different from each other.

According to the manner of SSB transmission based on frequency domain multiplexing in the embodiments of the present disclosure, SSBs can be increased flexibly as required, and there will be higher SSB beam gains because SSBs are increased, so that coverage of the SSBs and effects of measuring operations (for example, selection of beams in initial access) based on the SSBs are enhanced.

It should be noted that the first SSB and the second SSB are used as examples to describe an SSB having different frequency domain positions as mentioned in various embodiments of the present disclosure. In fact, there can be more SSBs having different frequency domain positions (that are more than two).

For example, in an embodiment, the first configuration information described in the method 100 may be used to indicate at least one of the following:
1) the frequency domain position of the first SSB;
2) an offset of the frequency domain position of the first SSB relative to that of the second SSB;
3) a quasi-colocation QCL relationship between the first SSB and another SSB in an SSB set, where the SSB set includes the first SSB and the second SSB, and the SSB set may be a set of SSBs in a periodicity of transmitting SSBs in the downlink BWP; or the SSB set is a set of SSBs configured based on the first configuration information and/or the second configuration information; and
4) a periodicity of transmitting the first SSB.

For example, in an embodiment, the first SSB is associated with a first control resource set CORESET #0, and the second SSB is associated with second CORESET #0, where a configuration parameter of the first CORESET #0 is the same as a configuration parameter of the second CORESET #0. For example, the first CORESET #0 and the second CORESET #0 are a same CORESET, where a configuration parameter of a CORESET #0 includes a configuration of time and frequency domain resources, a detection window configuration, and the like. Clearly, in another embodiment, a configuration parameter of the first CORESET #0 may be different from a configuration parameter of the second CORESET #0. For example, the first CORESET #0 and the second CORESET #0 are different CORESET.

For example, in an embodiment, the first SSB is associated with a first configuration, and the second SSB is associated with a second configuration, where the first configuration and/or the second configuration include/includes at least one of the following:
1) a search space set (Type0-SS set or Type0A-SS set) of a Physical Downlink Control Channel (PDCCH) scrambled by a System Information-Radio Network Temporary Identifier (SI-RNTI);
2) a search space set (Type1-SS set) of a PDCCH scrambled by a Random Access-Radio Network Temporary Identifier (RA-RNTI);
3) a search space set (Type1-SS set) of a PDCCH scrambled by a Temporary Cell-Radio Network Temporary Identifier (TC-RNTI);
4) a search space set (Type2-SS set) of a PDCCH scrambled by a Paging-Radio Network Temporary Identifier (P-RNTI); and
5) a Physical Random Access CHannel (PRACH) configuration.

For example, in an embodiment, the first configuration information received in the embodiment 100 may be used to indicate the first configuration.

For example, in an embodiment, after the first configuration information is received by the terminal device in the embodiment 100, the method further includes: receiving third configuration information, where the third configuration information is used to indicate the first configuration.

For example, in an embodiment, in a case in which a network device does not indicate the first configuration of the first SSB to the terminal device, the first configuration of the first SSB is the same as the second configuration of the second SSB by default. That the first configuration is the same as the second configuration mentioned in various embodiments of this specification may be that types of information (for example, Type1-SS set and the PRACH configuration) included in the first configuration and the second configuration are the same, and content included in each piece of information is the same (for example, resources indicated by Type1-SS set are the same, and PRACH configurations are the same).

For example, in an embodiment, in a case in which the first SSB and the second SSB satisfy a QCL relationship, the first configuration of the first SSB is the same as the second configuration of the second SSB by default.

For example, in an embodiment, in a case in which the first SSB and the second SSB are configured with a same time domain position, the first configuration of the first SSB is the same as the second configuration of the second SSB by default.

For example, in an embodiment, the first configuration of the first SSB is different from the second configuration of the second SSB. That the first configuration is different from the second configuration mentioned in various embodiments of this specification may be that types of information (for example, Type1-SS set and the PRACH configuration) included in the first configuration and the second configuration are different, and/or content included in each piece of information is different (for example, resources indicated by Type1-SS set are different, and PRACH configurations are different).

For example, in an embodiment, after the first configuration information is received by the terminal device in the embodiment 100, the method further includes: monitoring a PDCCH in a search space associated with one SSB in an SSB set, where the SSB set includes the first SSB and the second SSB, and the SSB set may be a set of SSBs in a periodicity of transmitting SSBs in the downlink BWP; or the SSB set is a set of SSBs configured based on the first configuration information and/or the second configuration information.

For example, in an embodiment, after the first configuration information is received by the terminal device in the embodiment 100, the terminal device may further receive the first SSB and the second SSB, and perform at least one of the following based on the first SSB and/or the second SSB:
1) Radio Resource Management (RRM) measurement;
2) a Radio Link Monitoring (RLM) measurement;
3) Beam Failure Detection (BFD) measurement; and
4) a Layer 1 Reference Signal Received Power (L1-RSRP) measurement.

According to the synchronization signal transmission method provided in the foregoing embodiments of the present disclosure, the network device may transmit an SSB on resources on different frequencies at a same time, and transmit a parameter (for example, the first configuration parameter or the second configuration parameter) of frequency domain multiplexing. In this way, the terminal device obtains time and frequency domain distribution of an SSB set, and selects, based on the distribution and/or network configuration, one or more synchronization signal blocks that satisfy requirements to perform SSB-related communications operations, for example, initial access, RRM measurement, and the like.

To describe in detail the synchronization signal transmission method provided in the foregoing embodiments of the present disclosure, the synchronization signal transmission method will be described below in conjunction with several specific embodiments.

Embodiment 1

Embodiment 1 is an SSB-based cell search process. In this embodiment, a network device transmits a plurality of SSBs at different frequency positions in a target BWP. Frequency domain positions of the SSBs satisfy frequency positions indicated by a synchronization raster, and time domain positions of the SSBs complies with a rule of time domain distribution defined in 5G NR protocols. Time-frequency mapping of the SSBs is shown in FIG. 2. In FIG. 2, the SSBs on different frequencies at a same time may be mapped to same CORESET #0, and a manner of mapping depends on a PBCH/MIB configuration in each SSB. Clearly, in another embodiment, the SSBs on different frequencies at a same time may be mapped to different CORESET #0.

When the network device transmits SSBs in the foregoing manner, the cell search process of the terminal device is as follows:

Step 0: The terminal device performs cell search based on a synchronization raster, completes time and frequency synchronization, and obtains MIB information. By this step, the terminal device may obtain the time and frequency domain positions of the second SSB mentioned in the foregoing embodiments.

Step 1: The terminal device obtains system information (for example, SIB1, where the system information corresponds to the first configuration information in the foregoing embodiments), and obtains a parameter of SSB distribution in a current BWP, to obtain the time and frequency domain positions of the first SSB.

In some embodiments, the system information may indicate a quantity of SSBs for frequency domain multiplexing.

In some embodiments, the system information may indicate a frequency domain multiplexing parameter between SSBs and at least include one piece of the following information: frequency offsets of various SSBs relative to a specific reference point (for example, the lowest frequency point or the highest frequency point of CORESET #0), a relative frequency offset between SSBs, a frequency offset of a specific SSB (for example, an SSB on a lowest frequency or an SSB detected in cell search of the terminal device) relative to the specific reference point.

In some embodiments, the system information indicates a QCL relationship between SSBs.

In some embodiments, the system information indicates periodicities of transmitting SSBs on various frequencies.

Step 2: The terminal device determines a parameter associated with each SSB, including one of the following parameters: an SS set of a PDCCH scrambled by an SI-RNTI, an SS set of a PDCCH scrambled by an RA-RNTI, an SS set of a PDCCH scrambled by a TC-RNTI, an SS set of a PDCCH scrambled by a P-RNTI, and a PRACH parameter associated with the SSB.

In some embodiments, SSBs on different frequencies may use a same configuration parameter.

In some embodiments, for SSBs whose QCL relationship has been indicated, SSBs that satisfy QCL use a same configuration parameter.

In some embodiments, SSBs at a same time domain position use a same configuration parameter.

Step 3: The terminal device detects signal quality of an SSB in the BWP, selects one SSB to start initial access, transmits an RACH signal on an RACH resource associated with the SSB, and uses a QCL configuration of the SSB to receive a SIB, a paging message, a RAR message, or an MSG4 message.

In this step, the terminal device detects the signal quality of the SSB based on time and frequency domain position distribution of the SSB. The terminal device may re-detect signal quality of all SSBs in a subsequent SSB periodicity, and selects an SSB of the highest signal quality.

In some embodiments, if the system information has indicated a QCL relationship between SSBs, the terminal device performs weighted combination on results of signal measurement of SSBs that satisfy the QCL relationship; or the terminal device selects one of the SSBs for measuring and ignores measurement of an SSB QCL with the SSB.

If the network device indicates SSBs on a plurality of frequencies, the terminal device receives a Physical Downlink Shared CHannel (PDSCH). In some embodiments, the terminal device performs rate matching on the SSBs transmitted on the plurality of frequencies when transmitting PDSCH.

Embodiment 2

Embodiment 2 is an SSB-based cell measurement process. In this embodiment, a terminal device obtains time-frequency distribution information of an SSB in a target BWP.

In some embodiments, if the target BWP is an initial BWP of the terminal device, the terminal device obtains, based on system information, the time-frequency distribution information of the SSB in the target BWP (for example, obtains time-frequency distribution information of the first SSB and the second SSB based on the first configuration information and/or the second configuration information described in the foregoing embodiments).

In some embodiments, if the target BWP is not an initial BWP of the terminal device, the terminal device obtains, based on system information, the time-frequency distribution information of the SSB in the target BWP (for example, obtains time-frequency distribution information of the first SSB and the second SSB based on the first configuration information described in the foregoing embodiments). The system information may be RRC signaling, MAC CE signaling, Downlink Control Information (DCI) signaling, or a combination of a plurality of pieces of signaling.

In this embodiment, the time-frequency distribution information of the SSB includes at least one of the following parameters:

a. a position of a reference SSB, where the reference SSB is indicated by a system or a CD-SSB determined through a cell search procedure;

b. frequency domain position information of the SSB, where the information indicates a quantity of SSBs for frequency domain multiplexing in the target BWP; and the information indicates a position of the SSB in frequency domain, where an indicating manner is the same as that in Embodiment 1;

c. a QCL relationship between SSBs, where the information indicates a relationship between the SSBs, and an indicating manner may be that SSBs in same time domain and different frequency domain satisfy a QCL relationship, SSBs in same frequency domain and different time domain satisfy a QCL relationship, or a group of SSBs with one serial number is specified satisfying a QCL relationship;

d. a periodicity of transmitting an SSB, where SSBs in different frequency domain in the target BWP are separately configured to indicate different transmission periodicities, or the SSBs in the target BWP indicate a same transmission periodicity; and e. information about a parameter associated with an SSB, where the parameter associated with the SSB is determined based on a system message corresponding to the SSB, and includes one of the following parameters: an SS set of a PDCCH scrambled by an SI-RNTI, an SS set of a PDCCH scrambled by an RA-RNTI, an SS set of a PDCCH scrambled by a TC-RNTI, an SS set of a PDCCH scrambled by a P-RNTI, and a PRACH parameter associated with the SSB.

An SSB for channel measurement, for example, RLM measurement, BFD measurement, or L1-RSRP measurement, is configured based on the distribution of and the QCL relationship between the SSBs.

In this embodiment, the network device configures a plurality of SSBs in the target BWP on different frequencies at a same time for the terminal device. The terminal device simultaneously measures the plurality of SSBs in the target BWP at a corresponding time to obtain channel information of different links. The terminal device simultaneously detects channel conditions of the plurality of SSBs, thereby traversing SSB channel measurement more quickly.

In some embodiments, the network device configures the plurality of SSBs in the target BWP on different frequencies at a same time as satisfying a QCL relationship, and configures the terminal device to use the foregoing SSB measurement channel. The terminal device detects the foregoing SSBs, and performs weighted combination, to obtain a more accurate channel measurement result.

In some embodiments, the network device configures the plurality of SSBs in the target BWP on a same frequency at different times as satisfying a QCL relationship, and configures the terminal device to use the foregoing SSB measurement channel. The terminal device selects, with flexibility, one or more of the foregoing SSBs for measuring, and performs weighted combination, to obtain channel information.

Embodiment 3

Embodiment 3 is an SSB-based RRM measurement process. In this embodiment, a network device indicates, to a terminal device, SSB distribution in a current cell BWP or SSB distribution in a neighboring cell, for RRM listening.

The terminal device obtains time-frequency distribution information of an SSB in a target BWP.

If the target BWP is an initial BWP of the terminal device in the current cell, the terminal device obtains, based on system information, the time-frequency distribution information of the SSB in the target BWP.

If the target BWP is not an initial BWP of the terminal device in the current cell, or the target BWP is an BWP for the neighboring cell, the terminal device obtains, based on system information, the time-frequency distribution information of the SSB in the target BWP. The system information may be RRC signaling, MAC CE signaling, DCI signaling, or a combination of a plurality of pieces of signaling.

The time-frequency distribution information of the SSB includes at least one of the following parameters:

a. a position of a reference SSB, where the reference SSB is indicated by a system or determined through a cell search procedure;

b. frequency domain position information of the SSB, where the information indicates a quantity of SSBs for frequency domain multiplexing in the target BWP; and the information indicates a position of the SSB in frequency domain, where an indicating manner is the same as that in Embodiment 1;

c. a QCL relationship between SSBs, where the information indicates a relationship between the SSBs, and an indicating manner may be that SSBs in same time domain and different frequency domain satisfy a QCL relationship, SSBs in same frequency domain and different time domain satisfy a QCL relationship, or a group of SSBs with one serial number is specified satisfying a QCL relationship;

d. a periodicity of transmitting an SSB, where SSBs in different frequency domain in the target BWP are configured to separately indicate different transmission periodicities, or the SSBs in the target BWP indicate a same transmission periodicity; and An SSB for RRM measurement is configured based on the distribution of and the QCL relationship between the SSBs. The network device configures a plurality of SSBs in the target BWP on different frequencies at a same time for the terminal device. The terminal device simultaneously measures the plurality of SSBs in the target BWP at a corresponding time to obtain channel information of different links. The terminal device simultaneously detects channel conditions of the plurality of SSBs, thereby traversing SSB channel measurement more quickly.

In some embodiments, the network device configures the plurality of SSBs in the target BWP on different frequencies at a same time as satisfying a QCL relationship, and configures the terminal device to use the foregoing SSB measurement channel. The terminal device detects the foregoing SSBs, and performs combination to obtain a more accurate channel measurement result.

In some embodiments, the network device configures the plurality of SSBs in the target BWP on a same frequency at different times as satisfying a QCL relationship, and configures the terminal device to use the foregoing SSB measurement channel. The terminal device selects, with flexibility, one or more of the foregoing SSBs for measuring, and performs weighted combination, to obtain channel information.

The synchronization signal transmission method according to the embodiments of the present disclosure is described in detail above in conjunction with FIG. 1. The synchronization signal transmission method according to another embodiment of the present disclosure is described in detail below in conjunction with FIG. 3. It can be understood that interaction between a network device and a terminal device described on the network device side is the same as that described on the terminal device side in the method shown in FIG. 1. To avoid repetition, relevant descriptions are appropriately omitted.

FIG. 3 is a schematic flowchart of implementing a synchronization signal transmission method according to an embodiment of the present disclosure. The method may be applied to a network device side. As shown in FIG. 3, the method 300 includes:

S302: transmitting first configuration information, where the first configuration information is used to indicate a first synchronization signal block SSB, and a frequency domain position of the first SSB is different from that of a second SSB, where the second SSB is obtained by cell search; or the second SSB is indicated by second configuration information.

The first configuration information and the second configuration information may be carried in same or different signaling.

According to the synchronization signal transmission method provided in the embodiments of the present disclosure, the network device transmits the first configuration information, and indicates time and frequency domain resources of the first SSB and the second SSB based on the first configuration information and/or the second configuration information; or a terminal device determines the second SSB by cell search, and indicates time and frequency domain resources of the first SSB based on the first configuration information, where frequency domain positions of the first SSB and the second SSB are different from each other.

According to the manner of SSB transmission based on frequency domain multiplexing in the embodiments of the present disclosure, SSBs can be increased flexibly as required, and there will be more SSB beams because SSBs are increased, so that coverage of the SSBs and effects of measuring operations (for example, selection of beams in initial access) based on the SSBs are enhanced.

For example, in an embodiment, the first SSB and the second SSB are located in a same downlink BWP.

For example, in an embodiment, the first SSB and the second SSB are located in an initial downlink BWP.

The initial downlink BWP is indicated in one of the following manners: indicated by a PBCH included in the second SSB;
  indicated by System Information Block 1 (SIB1); and
  indicated by Radio Resource Control (RRC) signaling.

For example, in an embodiment, the first configuration information is used to indicate at least one of the following:
  the frequency domain position of the first SSB;
  an offset of the frequency domain position of the first SSB relative to that of the second SSB;
  a QCL relationship between the first SSB and another SSB in an SSB set, where the SSB set includes the first SSB and the second SSB; and
  a periodicity of transmitting the first SSB.

For example, in an embodiment, the first SSB is associated with first CORESET #0, and the second SSB is associated with second CORESET #0, where
  a configuration parameter of the first CORESET #0 is the same as a configuration parameter of the second CORESET #0.

For example, in an embodiment, the first SSB is associated with a first configuration, and the second SSB is associated with a second configuration, where the first configuration and/or the second configuration include/includes at least one of the following:
  a search space set of a PDCCH scrambled by an SI-RNTI;
  a search space set of a PDCCH scrambled by an RA-RNTI;
  a search space set of a PDCCH scrambled by a TC-RNTI;
  a search space set of a PDCCH scrambled by a P-RNTI; and
  a PRACH configuration.

For example, in an embodiment, the first configuration information is used to indicate the first configuration; or
  after the first configuration information is transmitted, the method further includes: transmitting third configuration information, where the third configuration information is used to indicate the first configuration.

For example, in an embodiment, in a case in which the network device does not indicate the first configuration to the terminal device, the first configuration is the same as the second configuration.

For example, in an embodiment, in a case in which the first SSB and the second SSB satisfy a QCL relationship, the first configuration is the same as the second configuration.

For example, in an embodiment, the first configuration is different from the second configuration.

For example, in an embodiment, after the first configuration information is transmitted, the method further includes:
  transmitting a PDCCH in a search space associated with one SSB in an SSB set, where
  the SSB set includes the first SSB and the second SSB.

For example, in an embodiment, the first SSB and/or the second SSB are/is used by the terminal device to perform at least one of the following:
  RRM measurement;
  RLM measurement;
  BFD measurement; and
  L1-RSRP measurement.

The synchronization signal transmission method according to the embodiments of the present disclosure is described in detail above in conjunction with FIG. 1 to FIG. 3. A terminal device according to an embodiment of the present disclosure is described in detail below with reference to FIG. 4.

FIG. 4 is a schematic structural diagram of a terminal device according to an embodiment of the present disclosure. As shown in FIG. 4, a terminal device 400 includes:
  a receiving module 402 that may be configured to receive first configuration information, where the first configuration information is used to indicate a first SSB, and a frequency domain position of the first SSB is different from that of a second SSB, where
  the second SSB is obtained by cell search; or
  the second SSB is indicated by second configuration information; and
  the first configuration information and the second configuration information may be carried in same or different signaling.

The terminal device provided in this embodiment of the present disclosure receives the first configuration information, and determines the time and frequency domain resources of the first SSB and the second SSB based on the first configuration information and/or the second configuration information; or determines the time and frequency domain resources of the second SSB by cell search, and determines the time and frequency domain resources of the first SSB based on the first configuration information, where the frequency domain positions of the first SSB and the second SSB are different from each other.

According to the manner of SSB transmission based on frequency domain multiplexing in the embodiments of the present disclosure, SSBs can be increased flexibly as required, and there will be more SSB beams because SSBs are increased, so that coverage of the SSBs and effects of measuring operations (for example, selection of beams in initial access) based on the SSBs are enhanced.

For example, in an embodiment, the first SSB and the second SSB are located in a same downlink BandWidth Part (BWP).

For example, in an embodiment, the first SSB and the second SSB are located in an initial downlink BWP.

The initial downlink BWP is indicated in one of the following manners:
  indicated by a Physical Broadcast CHannel (PBCH) included in the second SSB;
  indicated by System Information Block 1 (SIB1); and
  indicated by Radio Resource Control (RRC) signaling.

For example, in an embodiment, the first configuration information is used to indicate at least one of the following:
  the frequency domain position of the first SSB;
  an offset of the frequency domain position of the first SSB relative to that of the second SSB;
  a Quasi-CoLocation (QCL) relationship between the first SSB and another SSB in an SSB set, where the SSB set includes the first SSB and the second SSB; and
  a periodicity of transmitting the first SSB.

For example, in an embodiment, the first SSB is associated with a first control resource set CORESET #0, and the second SSB is associated with second CORESET #0, where
  a configuration parameter of the first CORESET #0 is the same as a configuration parameter of the second CORESET #0.

For example, in an embodiment, the first SSB is associated with a first configuration, and the second SSB is associated with a second configuration, where the first configuration and/or the second configuration include/includes at least one of the following:
  a search space set of a physical downlink control channel PDCCH scrambled by a System Information-Radio Network Temporary Identifier (SI-RNTI);
  a search space set of a PDCCH scrambled by a Random Access-Radio Network Temporary Identifier (RA-RNTI);
  a search space set of a PDCCH scrambled by a Temporary Cell-Radio Network Temporary Identifier (TC-RNTI);
  a search space set of a PDCCH scrambled by a Paging-Radio Network Temporary Identifier (P-RNTI); and
  a Physical Random Access CHannel (PRACH) configuration.

For example, in an embodiment, the first configuration information is used to indicate the first configuration; or
  the receiving module 402 may further be configured to receive third configuration information, where the third configuration information is used to indicate the first configuration.

For example, in an embodiment, in a case in which a network device does not indicate the first configuration to the terminal device, the first configuration is the same as the second configuration.

For example, in an embodiment, in a case in which the first SSB and the second SSB satisfy a QCL relationship, the first configuration is the same as the second configuration.

For example, in an embodiment, the first configuration is different from the second configuration.

For example, in an embodiment, the receiving module 402 may further be configured to monitor a PDCCH in a search space associated with one SSB in an SSB set, where the SSB set includes the first SSB and the second SSB.

For example, in an embodiment, the receiving module 402 may further be configured to perform at least one of the following based on the first SSB and/or the second SSB:
  Radio Resource Management (RRM) measurement;
  Radio Link Monitoring (RLM) measurement;
  Beam Failure Detection (BFD) measurement; and
  layer 1 reference signal received power L1-RSRP measurement.

The terminal device 400 according to this embodiment of the present disclosure may be referenced to the procedure corresponding to the method 100 according to the corresponding embodiments of the present disclosure. Furthermore, each unit/module in the terminal device 400 and the foregoing other operations and/or functions are used to implement corresponding procedure of the method 100, and the same or equivalent technical effects can be achieved. For brevity, details are not provided herein again.

Figure 5:
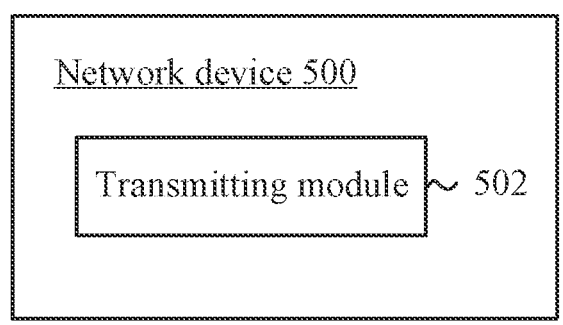
FIG. 5 is a schematic structural diagram of a network device according to an embodiment of the present disclosure.

FIG. 5 is a schematic structural diagram of a network device according to an embodiment of the present disclosure. As shown in FIG. 5, the network device 500 includes:
  a transmitting module 502 that may be configured to transmit first configuration information, where the first configuration information is used to indicate a first SSB, and a frequency domain position of the first SSB is different from that of a second SSB, where
  the second SSB is obtained by cell search; or
  the second SSB is indicated by second configuration information; and
  the first configuration information and the second configuration information may be carried in same or different signaling.

The network device provided in this embodiment of the present disclosure transmits the first configuration information, and indicates time and frequency domain resources of the first SSB and the second SSB based on the first configuration information and/or the second configuration information; or a terminal device determines time and frequency domain resources of the second SSB by cell search, and indicates time and frequency domain resources of the first SSB based on the first configuration information, where frequency domain positions of the first SSB and the second SSB are different from each other.

According to the manner of SSB transmission based on frequency domain multiplexing in the embodiments of the present disclosure, SSBs can be increased flexibly as required, and there will be more SSB beams because SSBs are increased, so that coverage of the SSBs and effects of measuring operations (for example, selection of beams in initial access) based on the SSBs are enhanced.

For example, in an embodiment, the first SSB and the second SSB are located in a same downlink BWP.

For example, in an embodiment, the first SSB and the second SSB are located in an initial downlink BWP.

The initial downlink BWP is indicated in one of the following manners:
  indicated by a PBCH included in the second SSB;
  indicated by SIB1; and indicated by RRC signaling.

For example, in an embodiment, the first configuration information is used to indicate at least one of the following:
  the frequency domain position of the first SSB;
  an offset of the frequency domain position of the first SSB relative to that of the second SSB;

a QCL relationship between the first SSB and another SSB in an SSB set, where the SSB set includes the first SSB and the second SSB; and a periodicity of transmitting the first SSB.

For example, in an embodiment, the first SSB is associated with first CORESET #0, and the second SSB is associated with second CORESET #0, where a configuration parameter of the first CORESET #0 is the same as a configuration parameter of the second CORESET #0.

For example, in an embodiment, the first SSB is associated with a first configuration, and the second SSB is associated with a second configuration, where the first configuration and/or the second configuration include/includes at least one of the following:

a search space set of a PDCCH scrambled by an SI-RNTI;
a search space set of a PDCCH scrambled by an RA-RNTI;
a search space set of a PDCCH scrambled by a TC-RNTI;
a search space set of a PDCCH scrambled by a P-RNTI; and
a PRACH configuration.

For example, in an embodiment, the first configuration information is used to indicate the first configuration; or the transmitting module 502 may be configured to transmit third configuration information, where the third configuration information is used to indicate the first configuration.

For example, in an embodiment, in a case in which the network device does not indicate the first configuration to the terminal device, the first configuration is the same as the second configuration.

For example, in an embodiment, in a case in which the first SSB and the second SSB satisfy a QCL relationship, the first configuration is the same as the second configuration.

For example, in an embodiment, the first configuration is different from the second configuration.

For example, in an embodiment, the transmitting module 502 may be configured to transmit a PDCCH in a search space associated with one SSB in an SSB set, where the SSB set includes the first SSB and the second SSB.

For example, in an embodiment, the first SSB and/or the second SSB are/is used by the terminal device to perform at least one of the following:

RRM measurement;
RLM measurement;
BFD measurement; and
L1-RSRP measurement.

The network device 500 according to this embodiment of the present disclosure may be referenced to the procedure corresponding to the method 300 according to the corresponding embodiments of the present disclosure. Furthermore, each unit/module in the network device 500 and the foregoing other operations and/or functions are used to implement corresponding procedure of the method 300, and the same or equivalent technical effects can be achieved. For brevity, details are not provided herein again.

The embodiments in this specification are described in a progressive manner. Each embodiment usually focuses on a difference from another embodiment. For a same or similar part of the embodiments, refer to each other. The device embodiment is described simply because the device embodiment is similar to the method embodiment. For related details, refer to partial description of the method embodiment.

Figure 6:
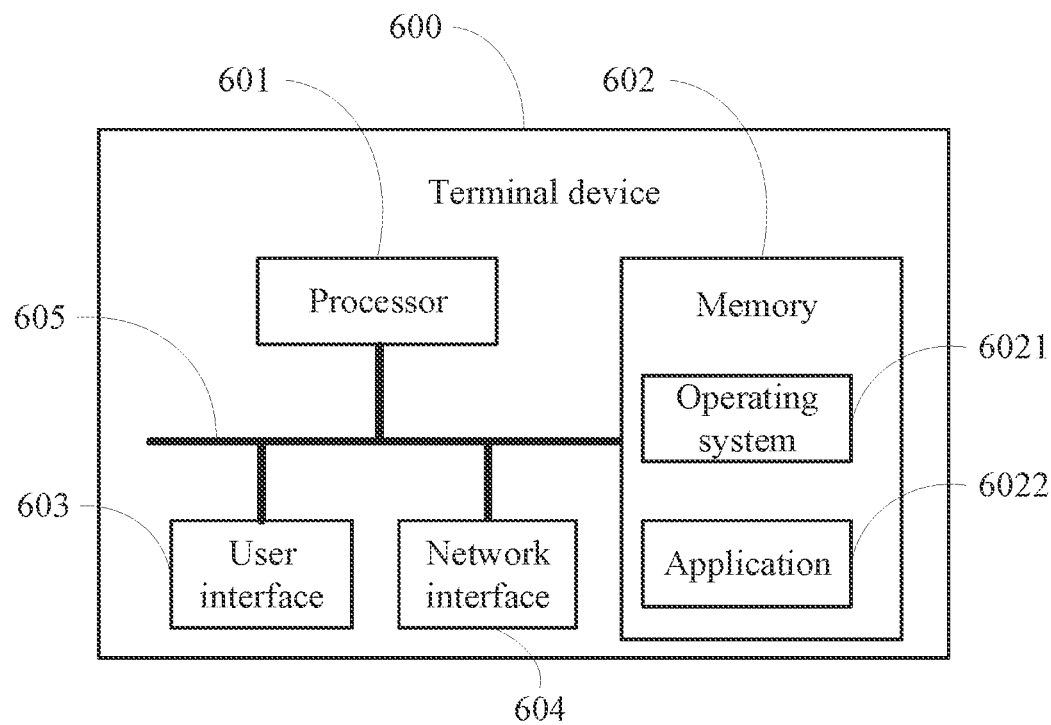
FIG. 6 is a schematic structural diagram of a terminal device according to another embodiment of the present disclosure.

FIG. 6 is a block diagram of a terminal device according to another embodiment of the present disclosure. A terminal device 600 shown in FIG. 6 includes at least one processor 601, a memory 602, at least one network interface 604, and a user interface 603. All components in the terminal device 600 are coupled together through a bus system 605. It may be understood that the bus system 605 is configured to implement connection and communication between these components. In addition to a data bus, the bus system 605 further includes a power bus, a control bus, and a status signal bus. However, for clear description, various buses are marked as the bus system 605 in FIG. 6.

The user interface 603 may include a display, a keyboard, a clicking device (for example, a mouse, a trackball), a touch panel, or a touchscreen.

It may be understood that the memory 602 in this embodiment of the present disclosure may be a volatile memory or a non-volatile memory, or may include both a volatile memory and a non-volatile memory. The nonvolatile memory may be a Read-only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through exemplary but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 602 of the system and method described in the embodiments of the present disclosure is intended to include but is not limited to these and any other suitable type of memory.

In some implementations, the memory 602 stores the following elements: an executable module or a data structure, or a subset thereof, or an extension set thereof: an operating system 6021 and an application program 6022.

The operating system 6021 includes various system programs, for example, a framework layer, a kernel library layer, and a driver layer, and is configured to implement various basic services and process a hardware-based task. The application program 6022 includes various application programs, for example, a media player and a browser, and is configured to implement various application services. A program for implementing the method in the embodiments of the present disclosure may be included in the application program 6022.

In this embodiment of the present disclosure, the terminal device 600 further includes a computer program stored in a memory 602 and capable of running on a processor 601; and when the computer program is executed by the processor 601, the steps of the following method embodiment 100 are implemented.

The foregoing method disclosed in the embodiments of the present disclosure may be applied to the processor 601, or implemented by the processor 601. The processor 601 may be an integrated circuit chip, and has a signal processing capability. In an implementation process, the steps in the foregoing methods may be completed by using an integrated logic circuit of hardware in the processor 601 or an instruction in a form of software. The processor 601 may be a general purpose processor, a Digital Signal Processor (DSP), an Application Specific Integrated Circuit (ASIC), a Field Programmable Gate Array (FPGA), another programmable logic device, a discrete gate, a transistor logic device, or a discrete hardware component. The methods, steps, and logical block diagrams disclosed in the embodiments of the present disclosure may be implemented or executed. The general purpose processor may be a microprocessor, or the processor may be any conventional processor or the like.

The steps of the method disclosed with reference to the embodiments of the present disclosure may be directly performed by a hardware decoding processor, or may be performed by using a combination of hardware and software modules in a decoding processor. The software module may be located in a computer-readable storage medium that is mature in the art, such as a random access memory, a flash memory, a read-only memory, a programmable read-only memory, an electrically erasable programmable memory, or a register. The computer-readable storage medium is located in the memory 602, and the processor 601 reads information in the memory 602 and completes the steps in the foregoing method in combination with hardware of the processor. In some embodiments, the computer-readable storage medium stores a computer program, and when the computer program is executed by the processor 601, the steps of the foregoing method embodiment 100 are performed.

It may be understood that the embodiments described in the embodiments of the present disclosure may be implemented by hardware, software, firmware, middleware, microcode, or a combination thereof. For implementation with hardware, the processing unit can be implemented in one or more Application Specific Integrated Circuits (ASIC), a Digital Signal Processing (DSP), a DSP Device (DSPD), a Programmable Logic Device (PLD), a Field-Programmable Gate Arrays (FPGA), general processors, controllers, micro-controllers, microprocessors, and another electronic unit for implementing the functions of this application, or their combinations.

For software implementations, the techniques described in embodiments of the present disclosure may be implemented by modules (for example, processes or functions) that perform the functions described in the embodiments of the present disclosure. The software code may be stored in a memory and executed by a processor. The memory may be implemented in or outside the processor.

The terminal device 600 can implement each process implemented by the terminal device in the foregoing embodiments, and the same or equivalent technical effects can be achieved. To avoid repetition, details are not described herein again.

Figure 7:
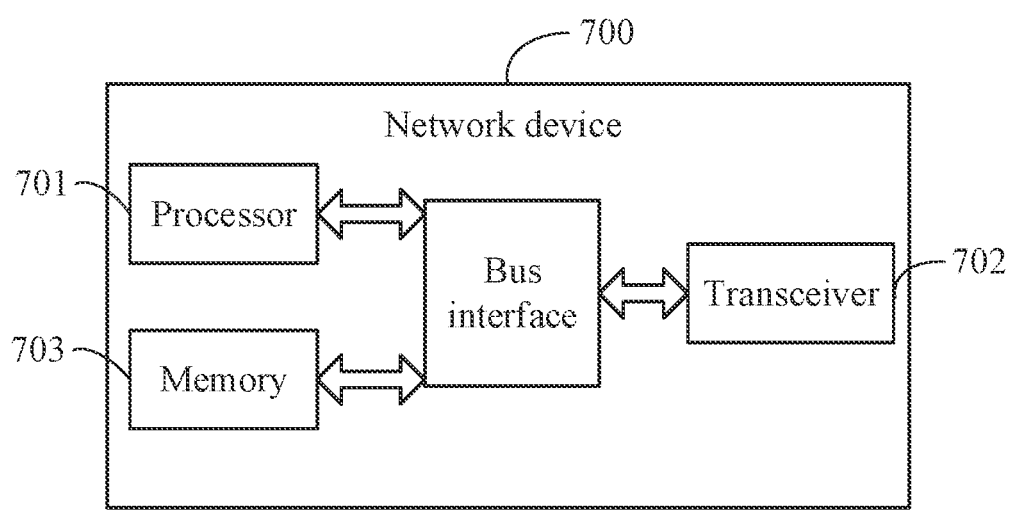
FIG. 7 is a schematic structural diagram of a network device according to another embodiment of the present disclosure.

Refer to FIG. 7. FIG. 7 is a structural diagram of a network device to which an embodiment of the present disclosure is applied. The network device can implement details of the method embodiment 300 and achieve the same effects. As shown in FIG. 7, a network device 700 includes a processor 701, a transceiver 702, a memory 703, and a bus interface.

In the embodiment of the present disclosure, the network device 700 further includes: a computer program stored in the memory 703 and capable of running on the processor 701. When the computer program is executed by the processor 701, the steps of the method embodiment 300 are implemented.

In FIG. 7, a bus architecture may include any quantity of interconnected buses and bridges, and is specifically linked by various circuits of one or more processors represented by the processor 701 and a memory represented by the memory 703. The bus architecture may further link various other circuits such as a peripheral device, a voltage regulator, and a power management circuit together. These are all well-known in the art, and therefore are not further described in this specification. The bus interface provides interfaces. The transceiver 702 may be a plurality of elements, in other words, includes a transmitter and a receiver, and provides a unit configured to communicate with various other apparatuses on a transmission medium.

The processor 701 is responsible for managing the bus architecture and common processing, and the memory 703 may store data used when the processor 701 performs an operation.

An embodiment of the present disclosure further provides a computer-readable storage medium. The computer-readable storage medium stores a computer program, and when a processor executes the computer program, the processes of any one of the foregoing method embodiment 100 and the method embodiment 300 are implemented, and the same technical effects can be achieved. To avoid repetition, details are not described herein again. The computer-readable storage medium includes a Read-Only Memory (ROM), a Random Access Memory (RAM), a magnetic disk, an optical disc, or the like.

It should be noted that, in this specification, the terms "include", "include", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In the absence of more restrictions, an element defined by the statement "including a . . . " does not preclude the presence of other identical elements in the process, method, article, or apparatus that includes the element.

By means of the foregoing description of the embodiments, a person skilled in the art may clearly understand that the method in the foregoing embodiments may be implemented by software in addition to a necessary universal hardware platform. Certainly, the method in the foregoing embodiments may also be implemented by hardware. However, in many cases, the former is a preferred embodiment. Based on such understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skill in the art may make many forms without departing from the objective of the present disclosure and the protection scope of claims, all of which fall within the protection of the present disclosure.

The invention claimed is:

1. A synchronization signal transmission method, wherein the method is performed by a terminal device and comprises:
receiving first configuration information, wherein the first configuration information is used to indicate a first time domain position and a first frequency domain position of a first Synchronization Signal Block (SSB), and the first frequency domain position of the first SSB is different from a second frequency domain position of a second SSB,
wherein the first configuration information is further used to indicate a Quasi-CoLocation (QCL) relationship between the first SSB and another SSB in an SSB set, wherein the SSB set comprises the first SSB and the second SSB, wherein at least two SSBs in the SSB set in a same time domain but different frequency domains satisfy the QCL relationship, wherein a second time domain position and the second frequency domain position of the second SSB are obtained by cell search; or the second time domain position and the second frequency domain position of the second SSB are indicated by second configuration information; wherein the first configuration information and the second configuration information are carried in same or different signaling, wherein the first SSB is associated with a first COntrol REsource SET #0 (CORESET #0), and the second SSB is associated with second CORESET #0, a configuration parameter of the first CORESET #0 is the same as a configuration parameter of the second CORESET #0, and a configuration parameter of a CORESET #0 comprises a configuration of time and frequency domain resources;

wherein the first SSB is associated with a first configuration, and the second SSB is associated with a second configuration, wherein the first configuration or the second configuration comprises:

a search space set of a Physical Downlink Control CHannel (PDCCH) scrambled by a Paging-Radio Network Temporary Identifier (P-RNTI).

2. The method according to claim 1, wherein the first SSB and the second SSB are located in a same downlink BandWidth Part (BWP).

3. The method according to claim 2, wherein the first SSB and the second SSB are located in an initial downlink BWP, wherein the initial downlink BWP is indicated in one of the following manners:

indicated by a Physical Broadcast CHannel (PBCH) comprised in the second SSB;

indicated by System Information Block 1 (SIB1); or indicated by Radio Resource Control (RRC) signaling.

4. The method according to claim 1, wherein the first configuration information is further used to indicate at least one of the following:

an offset of the frequency domain position of the first SSB relative to that of the second SSB;

a periodicity of transmitting the first SSB.

5. The method according to claim 1, wherein the first configuration or the second configuration further comprises at least one of the following:

a search space set of a PDCCH scrambled by a System Information-Radio Network Temporary Identifier (SI-RNTI);

a search space set of a PDCCH scrambled by a Random Access-Radio Network Temporary Identifier (RA-RNTI);

a search space set of a PDCCH scrambled by a Temporary Cell-Radio Network Temporary Identifier (TC-RNTI); or a Physical Random Access CHannel (PRACH) configuration.

6. The method according to claim 5, wherein the first configuration information is used to indicate the first configuration; or after the receiving first configuration information, the method further comprises: receiving third configuration information, wherein the third configuration information is used to indicate the first configuration.

7. The method according to claim 5, wherein when a network device does not indicate the first configuration to the terminal device, the first configuration is the same as the second configuration.

8. The method according to claim 5, wherein when the first SSB and the second SSB satisfy a QCL relationship, the first configuration is the same as the second configuration.

9. The method according to claim 5, wherein the first configuration is different from the second configuration.

10. The method according to claim 9, wherein after the receiving first configuration information, the method further comprises:

monitoring a PDCCH in a search space associated with one SSB in an SSB set, wherein the SSB set comprises the first SSB and the second SSB.

11. The method according to claim 1, wherein after the receiving first configuration information, the method further comprises:

performing at least one of the following actions based on the first SSB or the second SSB:

Radio Resource Management (RRM) measurement;

Radio Link Monitoring (RLM) measurement;

Beam Failure Detection (BFD) measurement; or

Layer 1 Reference Signal Received Power (L1-RSRP) measurement.

12. A terminal device, comprising:

a memory storing computer-readable instructions; and a processor coupled to the memory and configured to execute the computer-readable instructions, wherein the computer-readable instructions, when executed by the processor, cause the processor to perform operations comprising:

receiving first configuration information, wherein the first configuration information is used to indicate a first time domain position and a first frequency domain position of a first Synchronization Signal Block (SSB), and the first frequency domain position of the first SSB is different from a second frequency domain position of a second SSB, wherein the first configuration information is further used to indicate a Quasi-CoLocation (QCL) relationship between the first SSB and another SSB in an SSB set, wherein the SSB set comprises the first SSB and the second SSB, wherein at least two SSBs in the SSB set in a same time domain but different frequency domains satisfy the QCL relationship, wherein a second time domain position and the second frequency domain position of the second SSB are obtained by cell search; or the second time domain position and the second frequency domain position of the second SSB are indicated by second configuration information; wherein the first configuration information and the second configuration information are carried in same or different signaling, wherein the first SSB is associated with a first Control REsource SET #0 (CORESET #0), and the second SSB is associated with second CORESET #0, a configuration parameter of the first CORESET #0 is the same as a configuration parameter of the second CORESET #0, and a configuration parameter of a CORESET #0 comprises a configuration of time and frequency domain resources;
wherein the first SSB is associated with a first configuration, and the second SSB is associated with a second configuration, wherein the first configuration or the second configuration comprises:
a search space set of a Physical Downlink Control CHannel (PDCCH) scrambled by a Paging-Radio Network Temporary Identifier (P-RNTI).

13. The terminal device according to claim 12, wherein the first SSB and the second SSB are located in a same downlink BandWidth Part (BWP).

14. The terminal device according to claim 13, wherein the first SSB and the second SSB are located in an initial downlink BWP, wherein
the initial downlink BWP is indicated in one of the following manners:
indicated by a Physical Broadcast CHannel (PBCH) comprised in the second SSB;
indicated by System Information Block 1 (SIB1); or
indicated by Radio Resource Control (RRC) signaling.

15. The terminal device according to claim 12, wherein the first configuration information is further used to indicate at least one of the following:
an offset of the frequency domain position of the first SSB relative to that of the second SSB;
or
a periodicity of transmitting the first SSB.

16. The terminal device according to claim 12, wherein the first configuration or the second configuration further comprises at least one of the following:
a search space set of a PDCCH scrambled by a System Information-Radio Network Temporary Identifier (SI-RNTI);
a search space set of a PDCCH scrambled by a Random Access-Radio Network Temporary Identifier (RA-RNTI);
a search space set of a PDCCH scrambled by a Temporary Cell-Radio Network Temporary Identifier (TC-RNTI); or
a Physical Random Access CHannel (PRACH) configuration.

17. The terminal device according to claim 16, wherein the first configuration information is used to indicate the first configuration; or
after the receiving first configuration information, the operations further comprise: receiving third configuration information, wherein the third configuration information is used to indicate the first configuration.

18. A network device, comprising:
a memory storing computer-readable instructions; and
a processor coupled to the memory and configured to execute the computer-readable instructions, wherein the computer-readable instructions, when executed by the processor, cause the processor to perform operations comprising:
transmitting first configuration information, wherein the first configuration information is used to indicate a first time domain position and a first frequency domain position of a first Synchronization Signal Block (SSB), and the first frequency domain position of the first SSB is different from a second frequency domain position of a second SSB,
wherein the first configuration information is further used to indicate a Quasi-CoLocation (QCL) relationship between the first SSB and another SSB in an SSB set, wherein the SSB set comprises the first SSB and the second SSB,
wherein at least two SSBs in the SSB set in a same time domain but different frequency domains satisfy the QCL relationship,
wherein
a second time domain position and the second frequency domain position of the second SSB are obtained by cell search of a terminal device; or
the second time domain position and the second frequency domain position of the second SSB are indicated by second configuration information; and
the first configuration information and the second configuration information are carried in same or different signaling,
wherein the first SSB is associated with a first COntrol REsource SET #0 (CORESET #0), and the second SSB is associated with second CORESET #0,
a configuration parameter of the first CORESET #0 is the same as a configuration parameter of the second CORESET #0, and
a configuration parameter of a CORESET #0 comprises a configuration of time and frequency domain resources;
wherein the first SSB is associated with a first configuration, and the second SSB is associated with a second configuration, wherein the first configuration or the second configuration comprises:
a search space set of a Physical Downlink Control CHannel (PDCCH) scrambled by a Paging-Radio Network Temporary Identifier (P-RNTI).

* * * * *